(12) United States Patent
Cardalda-Garcia et al.

(10) Patent No.: US 10,396,909 B1
(45) Date of Patent: Aug. 27, 2019

(54) MULTI-ANTENNA TEST SYSTEM AND METHOD

(71) Applicant: Rohde & Schwarz GmbH & Co. KG, Munich (DE)

(72) Inventors: Adrian Cardalda-Garcia, Munich (DE); Bledar Karajani, Munich (DE); Niels Petrovic, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/020,494

(22) Filed: Jun. 27, 2018

(51) Int. Cl.
*H04B 17/00* (2015.01)
*H04B 17/15* (2015.01)

(52) U.S. Cl.
CPC ......... *H04B 17/15* (2015.01); *H04B 17/0085* (2013.01)

(58) Field of Classification Search
CPC .......... H04B 17/15; H04B 3/46; H04B 10/07; H04B 17/0085
USPC ............ 455/423, 67.11, 67.12, 67.14, 115.1, 455/115.2
See application file for complete search history.

(56) References Cited

U.S. PATENT DOCUMENTS

| | | | |
|---|---|---|---|
| 9,692,530 B2 * | 6/2017 | O'Keeffe | H01Q 21/24 |
| 9,798,314 B2 * | 10/2017 | Dougherty | G05B 19/402 |
| 9,893,820 B2 * | 2/2018 | Nardozza | H04B 17/12 |
| 9,991,592 B1 * | 6/2018 | Rowell | H01Q 3/267 |
| 2008/0056340 A1 * | 3/2008 | Foegelle | H04B 17/0082 375/224 |
| 2010/0285753 A1 | 11/2010 | Foegelle | |
| 2011/0299570 A1 * | 12/2011 | Reed | H04B 7/0434 375/130 |
| 2012/0282863 A1 * | 11/2012 | Guo | H04B 7/04 455/67.12 |
| 2015/0054687 A1 * | 2/2015 | Reed | H04B 17/0085 342/361 |
| 2015/0099473 A1 * | 4/2015 | Szini | H04W 24/06 455/67.12 |

FOREIGN PATENT DOCUMENTS

WO  WO2014175926 A1  10/2014

* cited by examiner

*Primary Examiner* — Sonny Trinh
(74) *Attorney, Agent, or Firm* — Potomac Technology Law, LLC

(57) ABSTRACT

A multi-antenna test system is provided. The multi-antenna test system includes a device under test and at least four antenna devices. The at least four antenna devices are spaced apart in a fixed angular relationship with respect to the device under test to create different certain angular relations between each pair of the at least four antenna devices.

18 Claims, 6 Drawing Sheets

MULTI-ANTENNA TEST SYSTEM AND METHOD

TECHNICAL FIELD

The invention relates to a multi-antenna test system and a corresponding multi-antenna test method, especially for performance testing.

BACKGROUND

Generally, in times of an increasing number of applications providing wireless communication capabilities employing multiple antennas, there is a growing need of a multi-antenna test system and a corresponding multi-antenna test method, such as for verifying correct functioning of the applications with the aid of a minimum number of test antennas in order to allow for testing in an efficient and cost-effective manner.

The publication US20100285753A1 discloses systems and methods for simulating a multipath environment for testing a device. In this context, a plurality of antennas are placed around a device under test in an anechoic chamber. Each of a plurality of the antennas is connected to a path of a variable path simulator capable of generating multiple paths between the antennas and external wireless communication test equipment. The variable path simulator introduces a delay spread into each path. In this way, a multipath environment is simulated with signals appearing to arrive from different angles and different distances. Each of a plurality of antennas may be adapted to produce substantially plane waves at the device under test. As it can be seen, due to the variety of different angels and different distances, the usage of the systems and methods disadvantageously leads to a limited efficiency, and thus also to increased cost.

What is needed, therefore, is a multi-antenna test system and a corresponding multi-antenna test method, especially for performance testing, each of which ensures both a high efficiency and reduced costs.

Some Example Embodiments

Embodiments of the present invention advantageously address the foregoing requirements and needs, as well as others, by providing a multi-antenna test system and a corresponding multi-antenna test method, especially for performance testing, each of which ensures both a high efficiency and reduced costs.

According to example embodiments, a multi-antenna test system is provided. The multi-antenna test system comprises a device under test, and at least four antenna devices. In this context, the at least four antenna devices are spaced apart in a fixed angular relationship with respect to the device under test to create different certain angular relations between each pair of the at least four antenna devices. Advantageously, testing can be performed in an efficient and cost-effective manner.

According to a first implementation form of the multi-antenna test system, at least one of the certain angular relations between each pair of the at least four antenna devices comprises an angle of 15 degrees, 30 degrees, 45 degrees, 60 degrees, 75 degrees, 90 degrees, 105 degrees, 120 degrees, 135 degrees, 150 degrees, 165 degrees or 180 degrees. Advantageously, efficiency can further be increased. In this context, the following set of angles between two antenna devices may be particularly advantageous: 30 degrees, 60 degrees, 90 degrees, 120 degrees, 150 degrees, 180 degrees. Further, by using four antennas, it is possible to establish six different angular relationships, in particular the foregoing set of angles, namely 30 degrees, 60 degrees, 90 degrees, 120 degrees, 150 degrees and 180 degrees. In other words, it is advantageous that four antennas are sufficient to create six different angular relationships.

According to a further implementation form of the multi-antenna test system, the at least four antenna devices are arranged in a circular manner around the device under test. Advantageously, complexity can be reduced, which leads to reduced costs.

According to a further implementation form of the multi-antenna test system, at least one of the at least four antenna devices comprises an antenna, such as a cross-polarized antenna. Advantageously, for instance, accuracy can be increased.

According to a further implementation form of the multi-antenna test system, at least one of the at least four antenna devices comprises an antenna array including at least two antenna elements, wherein at least one of the at least two antenna elements is a cross-polarized antenna element. Advantageously, with respect to multiple input multiple output (MIMO) capabilities, a respective performance testing can be done in an efficient manner.

According to a further implementation form of the multi-antenna test system, at least one, or at least one pair, of the at least four antenna devices is arranged within a near-field region with respect to the device under test. Advantageously, near-field characteristics can be investigated in an efficient manner.

According to a further implementation form of the multi-antenna test system, at least one, or at least one pair, of the at least four antenna devices is arranged within a far-field region with respect to the device under test, such as at a minimum far-field distance with respect to the device under test. Advantageously, far-field characteristics can be investigated in a cost-effective manner.

According to a further implementation form of the multi-antenna test system, for testing, only one pair of the at least four antenna devices is active, wherein the active pair defines the angle to be tested on the basis of the respective certain angular relation. Advantageously, costs can further be reduced.

According to a further implementation form of the multi-antenna test system, the multi-antenna test system further comprises a signal generator configured to generate at least one signal, such as at least one radio frequency signal, or at least one millimeter wave signal, and to pass the at least one signal to at least one of the at least four antenna devices. Advantageously, a predefined test signal can be transmitted by the at least one of the at least four antenna devices.

According to a further implementation form of the multi-antenna test system, the multi-antenna test system further comprises an anechoic chamber. Advantageously, interferences can efficiently be suppressed.

According to a further implementation form of the multi-antenna test system, at least one of the components, such as the device under test and the at least four antenna devices, of the test system is located within the anechoic chamber. Advantageously, costs can be saved by reducing the anechoic chamber size to a minimum due to locating solely the major components within the anechoic chamber.

According to a further implementation form of the multi-antenna test system, the multi-antenna test system further comprises a positioner configured to rotate the device under test in a two-dimensional, or in a three-dimensional, manner.

Advantageously, the beamforming behavior of the device under test can be investigated in a highly efficient and accurate manner.

According to a further implementation form of the multi-antenna test system, the positioner comprises at least two axes, such as two axes or at least three axes, wherein the axes are perpendicularly arranged with respect to each other. Advantageously, the complexity of the positioner is reduced to a minimum.

According to a further implementation form of the multi-antenna test system, the device under test is arranged in the center of a respective circle formed by the at least four antenna devices. Advantageously, complexity can further be reduced.

According to further example embodiments, a multi-antenna test method is provided. The multi-antenna test method comprises the step of spacing at least four antenna devices apart in a fixed angular relationship with respect to a device under test to create different certain angular relations between each pair of the at least four antenna devices. Advantageously, testing can be performed in an efficient and cost-effective manner.

According to a first implementation form of the multi-antenna test method, at least one of the certain angular relations between each pair of the at least four antenna devices comprises an angle of 15 degrees, 30 degrees, 45 degrees, 60 degrees, 75 degrees, 90 degrees, 105 degrees, 120 degrees, 135 degrees, 150 degrees, 165 degrees or 180 degrees. Advantageously, efficiency can further be increased. In this context, the following set of angles between two antenna devices may be particularly advantageous: 30 degrees, 60 degrees, 90 degrees, 120 degrees, 150 degrees, 180 degrees. Further, by using four antennas, it is possible to establish six different angular relationships, in particular the foregoing set of angles, namely 30 degrees, 60 degrees, 90 degrees, 120 degrees, 150 degrees and 180 degrees. In other words, it is advantageous that especially four antennas are sufficient to create six different angular relationships.

According to a further implementation form of the multi-antenna test method, the multi-antenna test method further comprises the step of arranging the at least four antenna devices in a circular manner around the device under test. Advantageously, complexity can be reduced, which especially leads to reduced costs.

According to a further implementation form of the multi-antenna test method, the multi-antenna test method further comprises the step of activating only one pair of the at least four antenna devices for testing, wherein the active pair defines the angle to be tested on the basis of the respective certain angular relation. Advantageously, costs can further be reduced.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

A multi-antenna test system and a corresponding multi-antenna test method, especially for performance testing, each of which ensures both a high efficiency and reduced costs, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Figure 1:
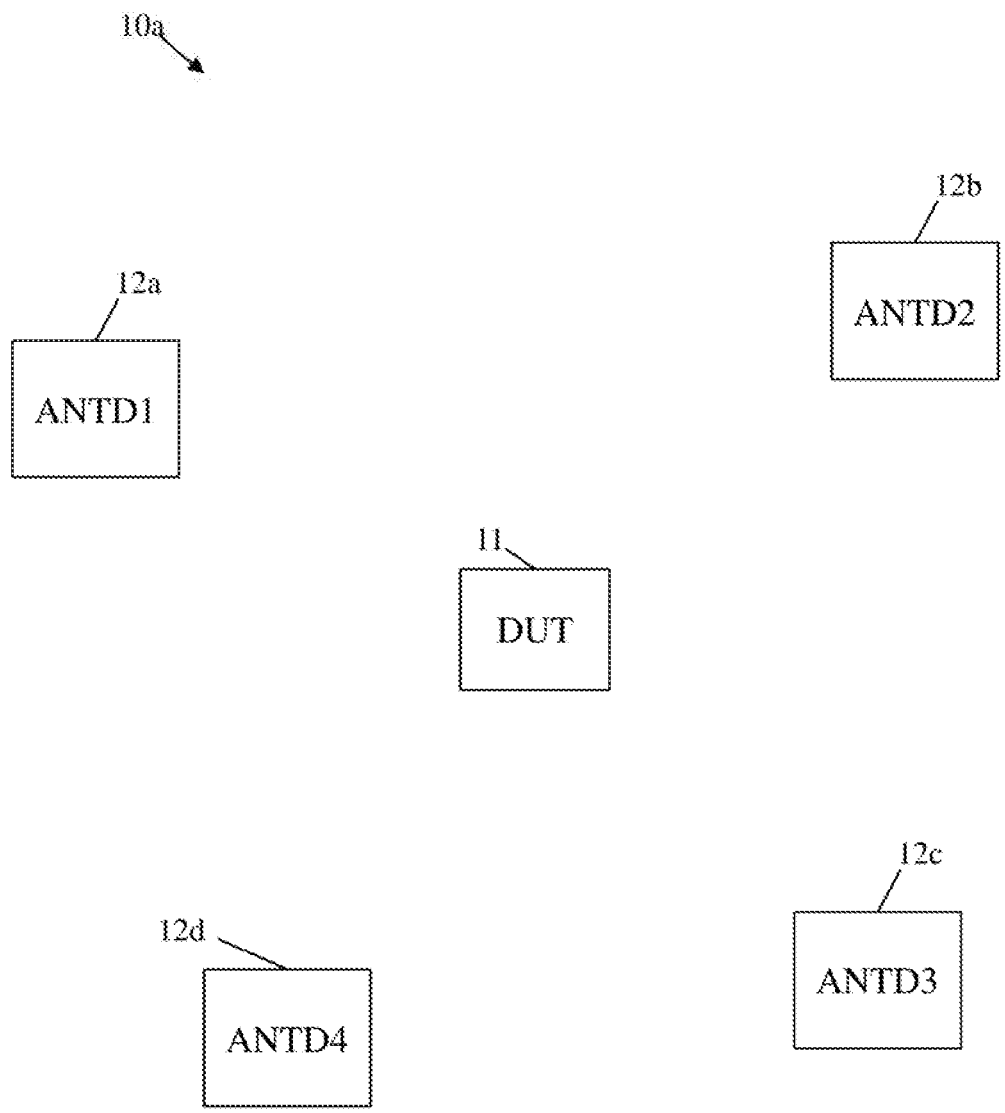
FIG. 1 shows an example multi-antenna test system according to example embodiments of the present invention.

FIG. 1 shows an example multi-antenna test system 10a according to example embodiments of the present invention. The multi-antenna test system 10a comprises a device under test 11, and at least four antenna devices, such as the four antenna devices ANTD1, ANTD2, ANTD3, ANTD4 (12a, 12b, 12c, 12d). In this context, the four antenna devices 12a, 12b, 12c, 12d are spaced apart in a fixed angular relationship with respect to the device under test 11 to create different certain angular relations between each pair of the four antenna devices 12a, 12b, 12c, 12d.

Further, at least one of the certain angular relations between each pair of the four antenna devices 12a, 12b, 12c, 12d may be an angle of 15, degrees, 30 degrees, 45 degrees, 60 degrees, 75 degrees, 90 degrees, 105 degrees, 120 degrees, 135 degrees, 150 degrees, 165 degrees or 180 degrees.

Further, the four antenna devices 12a, 12b, 12c, 12d may be arranged in a circular manner around the device under test 11.

Additionally or alternatively, at least one of the four antenna devices 12a, 12b, 12c, 12d may comprise an antenna, such as a cross-polarized antenna.

Additionally or alternatively, at least one of the four antenna devices 12a, 12b, 12c, 12d may comprise an antenna array comprising at least two antenna elements. In this context, at least one of the at least two antenna elements may be a cross-polarized antenna element.

Further, at least one, or at least one pair, of the four antenna devices 12a, 12b, 12c, 12d may be arranged within a near-field region with respect to the device under test 11.

Additionally or alternatively, at least one, or at least one pair, of the four antenna devices 12a, 12b, 12c, 12d may be arranged within a far-field region with respect to the device under test 11, such as at a minimum far-field distance with respect to the device under test 11.

Further, for testing, only one pair of the four antenna devices may be active. In this context, for example, such that the active pair defines the angle to be tested on the basis of the respective certain angular relation.

Figure 2:
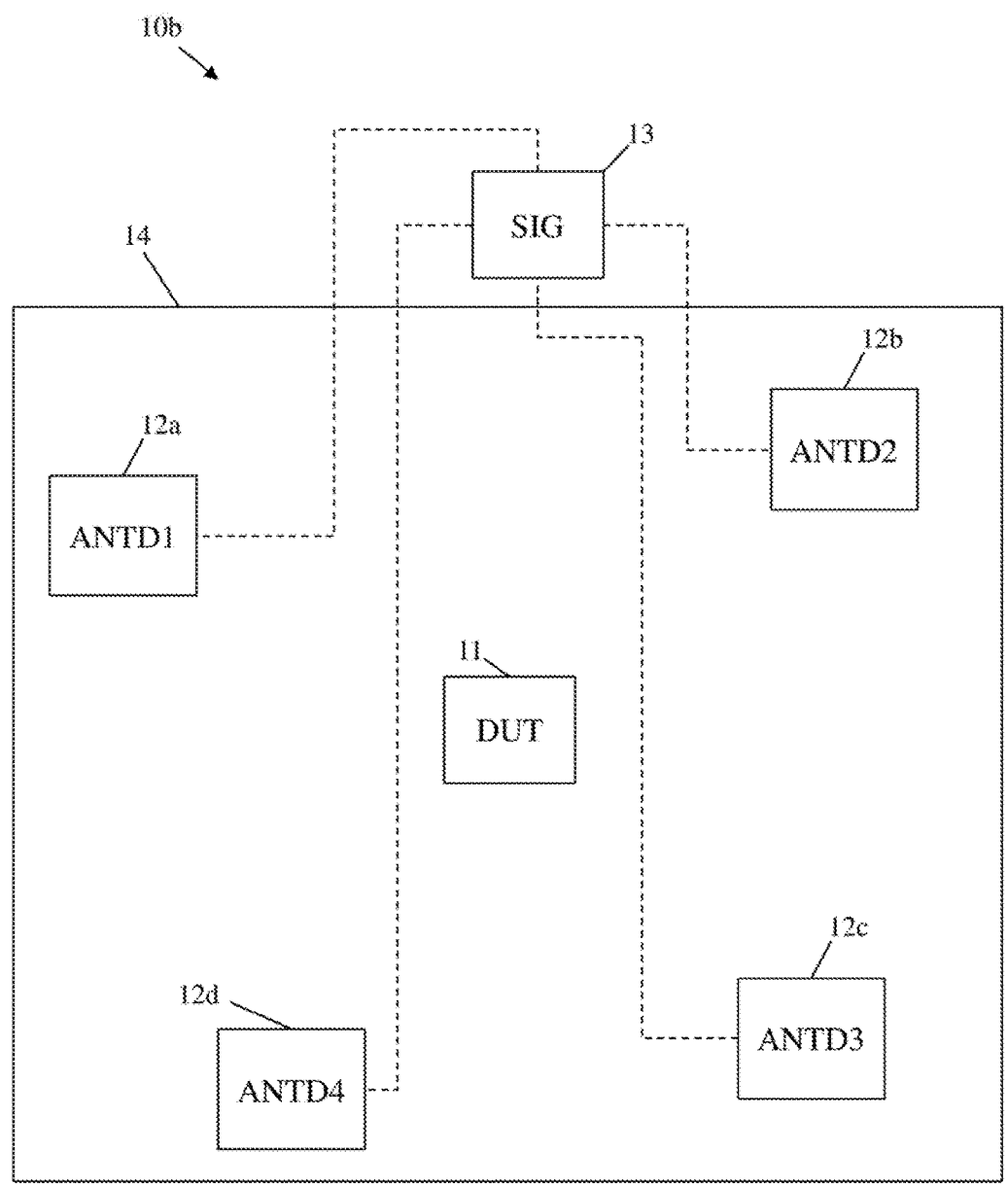
FIG. 2 shows a further example multi-antenna test system according to example embodiments of the present invention.

FIG. 2 shows a further example multi-antenna test system 10*b* according to example embodiments of the present invention. The multi-antenna test system 10*b* comprises the above-mentioned device under test 11 and the four antenna devices 12*a*, 12*b*, 12*c*, 12*d*, and further comprises a signal generator 13.

In this context, the signal generator 13 is configured to generate at least one signal, such as at least one radio frequency signal, or at least one millimeter wave signal, and to pass the at least one signal to at least one of the four antenna devices 12*a*, 12*b*, 12*c*, 12*d*.

Further, the multi-antenna test system may also comprise an anechoic chamber 14.

Further, at least one of the components, such as the device under test 11 and the four antenna devices 12*a*, 12*b*, 12*c*, 12*d*, of the test system 10*b* may be located within the anechoic chamber 14.

Figure 3:
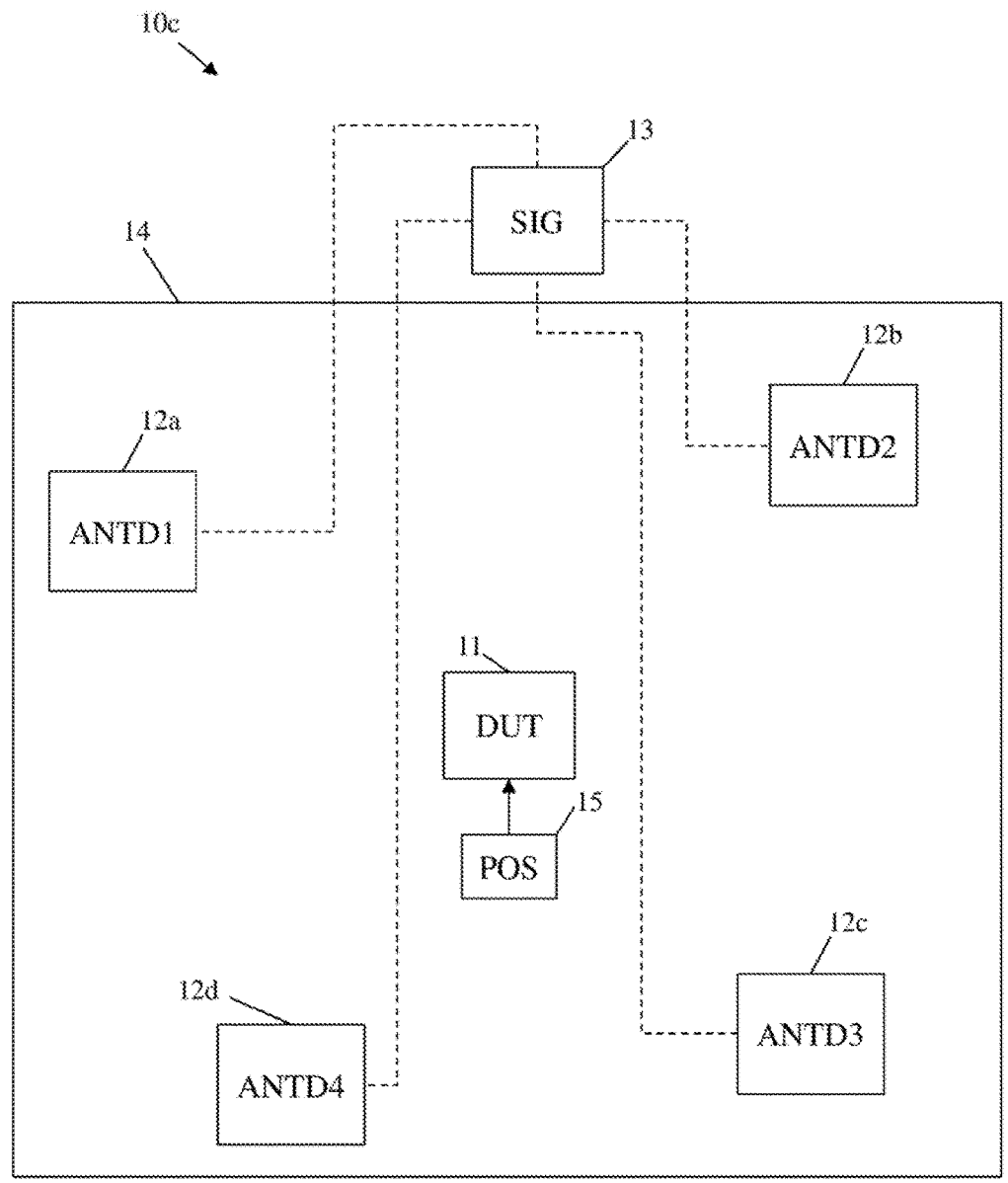
FIG. 3 shows a further example multi-antenna test system according to example embodiments of the present invention.

FIG. 3 shows a further example multi-antenna test system 10*c* according to example embodiments of the present invention. The multi-antenna test system 10*c* is based on the foregoing example multi-antenna test system 10*b*, where the example embodiment 10*c* further comprises a positioner 15 configured to rotate the device under test in a two-dimensional, or a three-dimensional, manner.

In this context, the positioner 15 may comprise at least two axes, or at least three axes, wherein the axes may be perpendicularly arranged with respect to each other.

The respective two-dimensional, or three-dimensional, rotation may be achieved by attaching only one of the at least two axes of the positioner 15 to the device under test 11, whereas the remaining axis is temporarily detached. In other words, for rotating the device under test 11 with respect to a desired rotational direction, the corresponding axes are temporarily, or temporarily and solely, attached to the device under test 11, whereas the remaining axis is temporarily detached. Then, if the device under test 11 should be rotated with respect to a further desired rotational direction, the procedure can be performed in an analogous manner with respect to the axis corresponding to the further desired rotational direction.

Further, with respect to each of the above-mentioned embodiments of the inventive multi-antenna test system 10*a*, 10*b*, 10*c*, the device under test 11 may be arranged in the center of the respective circle formed by the four antenna devices 12*a*, 12*b*, 12*c*, 12*d*.

Figure 4A:
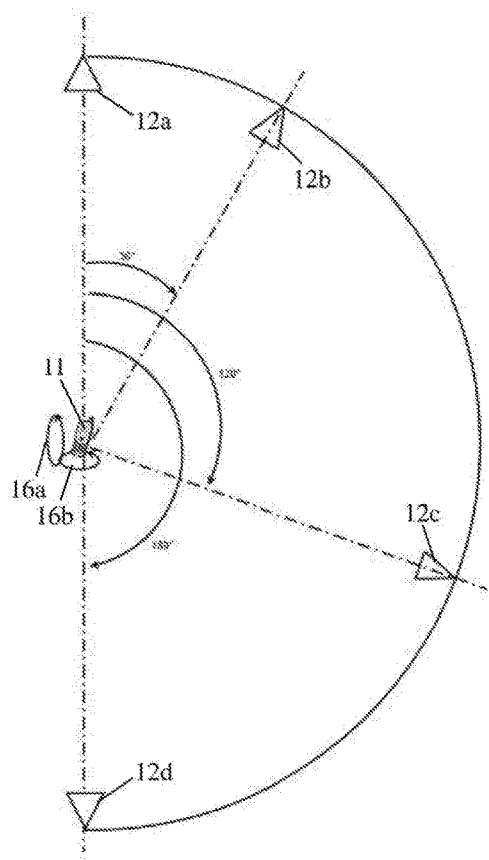
FIG. 4a shows an example system diagram with certain angular relations between four antenna devices according to example embodiments of the present invention.

Further, with respect to the certain angular relations between the four antenna devices 12*a*, 12*b*, 12*c*, 12*d*, FIG. 4*a* shows an example system diagram with certain angular relations between four antenna devices according to example embodiments of the present invention. With reference to FIG. 4*a*, a first certain angular relation between a first antenna device 12*a* and a second antenna device 12*b* being adjacent to the first antenna device 12*a* comprises an angle of 30 degrees. Further, a second certain angular relation between the first antenna device 12*a* and a third antenna device 12*c* being adjacent to the second antenna device 12*b*, and being not adjacent to the first antenna device 12*a*, comprises an angle of 120 degrees. Further, a third certain angular relation between the first antenna device 12*a* and a fourth antenna device 12*d* being adjacent to the third antenna device 12*c*, and being not adjacent to the second antenna device 12*b*, comprises an angle of 180 degrees.

Figure 4B:
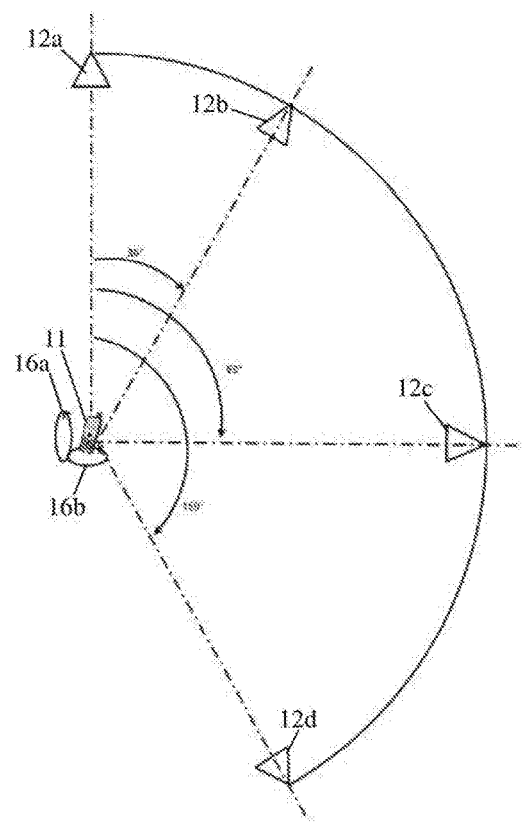
FIG. 4b shows a further example system diagram with certain angular relations between the four antenna devices according to example embodiments of the present invention.

FIG. 4*b* shows a further example system diagram with certain angular relations between the four antenna devices according to example embodiments of the present invention. With reference to FIG. 4*b*, a first certain angular relation between a first antenna device 12*a* and a second antenna device 12*b* being adjacent to the first antenna device 12*a* comprises an angle of 30 degrees. Further, a second certain angular relation between the first antenna device 12*a* and a third antenna device 12*c* being adjacent to the second antenna device 12*b*, and being not adjacent to the first antenna device 12*a*, comprises an angle of 90 degrees. Further, a third certain angular relation between the first antenna device 12*a* and a fourth antenna device 12*d* being adjacent to the third antenna device 12*c*, and being not adjacent to the second antenna device 12*b*, comprises an angle of 150 degrees.

Figure 4C:
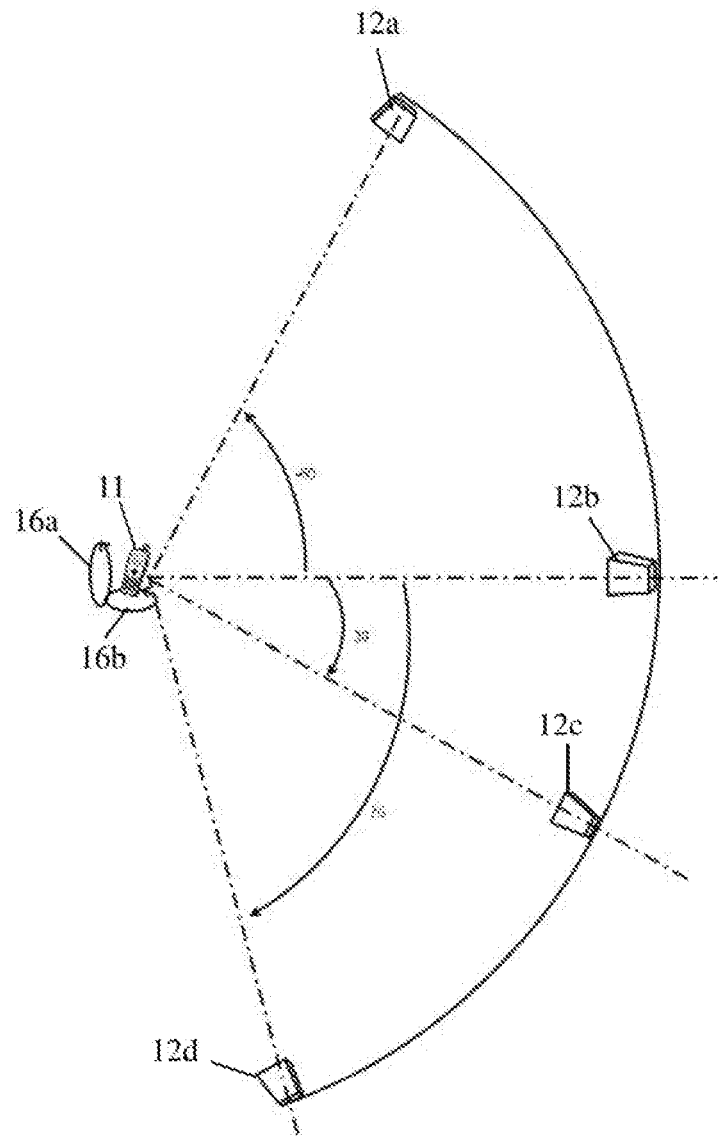
FIG. 4c shows a further example system diagram with certain angular relations between the four antenna devices according to example embodiments of the present invention.

FIG. 4*c* shows a further example system diagram with certain angular relations between the four antenna devices according to example embodiments of the present invention. With reference to FIG. 4*c*, a first certain angular relation between a first antenna device 12*a* and a second antenna device 12*b* being adjacent to the first antenna device 12*a* comprises an angle of 60 degrees. Further, a second certain angular relation between the first antenna device 12*a* and a third antenna device 12*c* being adjacent to the second antenna device 12*b*, and being not adjacent to the first antenna device 12*a*, comprises an angle of 90 degrees. Further, a third certain angular relation between the first antenna device 12*a* and a fourth antenna device 12*d* being adjacent to the third antenna device 12*c*, and being not adjacent to the second antenna device 12*b*, comprises an angle of 135 degrees.

In this context, the following set of angles between two antenna devices may be particularly advantageous: 30 degrees, 60 degrees, 90 degrees, 120 degrees, 150 degrees, 180 degrees. It is noted that by using four antennas according to this setup, it is possible to establish six different angular relationships, in particular the foregoing set of angles, namely 30 degrees, 60 degrees, 90 degrees, 120 degrees, 150 degrees and 180 degrees. In other words, it is particularly advantageous that four antennas are sufficient to create six different angular relationships.

Further, with respect to each of the above-mentioned system diagrams according to FIG. 4*a*, FIG. 4*b*, and FIG. 4*c*, the device under test can be rotated in a two-dimensional manner as illustrated by the two depicted paths 16*a*, 16*b* of motion or rotation, respectively.

Further, in the case that a maximum of two antenna devices is active at the same time, the device under test 11 and the two active antenna devices form a plane. As a consequence of this, there is no need to position the respective antenna device or the respective antenna devices in a three-dimensional distribution, which advantageously leads to a reduced complexity. Further, the device under test 11 can be placed in a positioning system or a positioner, respectively, that allows full rotation in two axes, thereby covering all possible angular relationships with the two active antenna devices.

Figure 5:
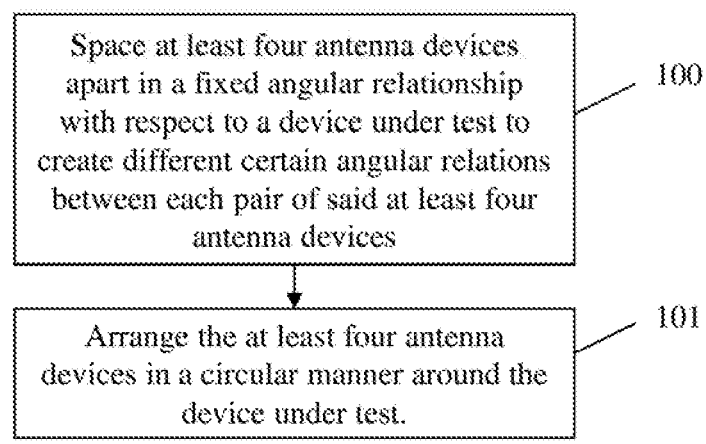
FIG. 5 shows a flow chart of a multi-antenna test method according to example embodiments of the present invention.

FIG. 5 shows a flow chart of a multi-antenna test method according to example embodiments of the present invention. In step 100, at least four antenna devices are spaced apart in a fixed angular relationship with respect to a device under test to create different certain angular relations between each pair of the at least four antenna devices. In step 101, the at least four antenna devices are arranged in a circular manner around the device under test.

In this context, at least one of the certain angular relations between each pair of the at least four antenna devices may be an angle of 15, degrees, 30 degrees, 45 degrees, 60 degrees, 75 degrees, 90 degrees, 105 degrees, 120 degrees, 135 degrees, 150 degrees, 165 degrees or 180 degrees.

In addition to this or as an alternative, at least one of the at least four antenna devices may comprise an antenna, such as a cross-polarized antenna.

Additionally or alternatively, at least one of the at least four antenna devices may comprise an antenna array comprising at least two antenna elements, wherein at least one of the at least two antenna elements may be a cross-polarized antenna element.

Further, at least one, or at least one pair, of the at least four antenna devices may be arranged within a near-field region with respect to the device under test.

In addition to this or as an alternative, at least one, or at least one pair, of the at least four antenna devices may be arranged within a far-field region with respect to the device under test, such as at a minimum far-field distance with respect to the device under test.

Further, the multi-antenna test method may also comprise the step of activating only one pair of the at least four antenna devices for testing, wherein the active pair defines the angle to be tested on the basis of the respective certain angular relation.

Additionally or alternatively, the multi-antenna test method may further comprise the step of generating at least one signal, such at least one radio frequency signal, or at least one millimeter wave signal, with the aid of a signal generator, and passing the at least one signal to at least one of the at least four antenna devices.

Further, the multi-antenna test method may also comprise the step of employing an anechoic chamber. In this context, the multi-antenna test method further comprises the step of arranging or locating at least one of the components, such as the device under test and the at least four antenna devices, within the anechoic chamber.

In addition to this or as an alternative, the multi-antenna test method may further comprise the step of rotating the device under test in a two-dimensional, or a three-dimensional, manner with the aid of a positioner.

The positioner may comprise at least two axes, or at least three axes, wherein the at axes are perpendicularly arranged with respect to each other.

Additionally or alternatively, the multi-antenna test method may further comprise the step of arranging the device under test in the center of the respective circle formed by the at least four antenna devices.

While various example embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the example embodiments of the present invention have been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A multi-antenna test system comprising:
   a device under test; and
   at least four antenna devices;
   wherein the at least four antenna devices are spaced apart in a fixed angular relationship with respect to the device under test to create different certain angular relations between each of a plurality of pairs of the at least four antenna devices; and
   wherein a maximum of two antenna devices of the at least four antenna devices is activated at the same time such that the device under test and the two active antenna devices form a plane.

2. The multi-antenna test system according to claim 1, wherein at least one of the certain angular relations between each pair of the at least four antenna devices is one of an angle of 15 degrees, 30 degrees, 45 degrees, 60 degrees, 75 degrees, 90 degrees, 105 degrees, 120 degrees, 135 degrees, 150 degrees, 165 degrees and 180 degrees.

3. The multi-antenna test system according to claim 1, wherein the at least four antenna devices are arranged in a circular manner around the device under test.

4. The multi-antenna test system according to claim 3, wherein the device under test is arranged in a center position of the respective circle formed by the at least four antenna devices.

5. The multi-antenna test system according to claim 1, wherein at least one of the at least four antenna devices comprises a cross-polarized antenna.

6. The multi-antenna test system according to claim 1, wherein at least one of the at least four antenna devices comprises an antenna array including at least two antenna elements, wherein at least one of the at least two antenna elements is a cross-polarized antenna element.

7. The multi-antenna test system according to claim 1, wherein at least one of the at least four antenna devices, or at least one pair of the at least four antenna devices, is arranged within a near-field region with respect to the device under test.

8. The multi-antenna test system according to claim 1, wherein at least one of the at least four antenna devices, or at least one pair of the at least four antenna devices, is arranged within a far-field region with respect to the device under test, such as at a minimum far-field distance with respect to the device under test.

9. The multi-antenna test system according to claim 1, wherein only one pair of the at least four antenna devices is active for testing, wherein the active pair defines an angle to be tested based on the respective certain angular relation.

10. The multi-antenna test system according to claim 1, further comprising:
    a signal generator configured to generate at least one signal, such as at least one radio frequency signal or at least one millimeter wave signal, and to pass the at least one signal to at least one of the at least four antenna devices.

11. The multi-antenna test system according to claim 1, further comprising:
    an anechoic chamber.

12. The multi-antenna test system according to claim 11, wherein at least one of the components of the test system, such as the device under test and the at least four antenna devices, is located within the anechoic chamber.

13. The multi-antenna test system according to claim 1, further comprising:
    a positioning device configured to rotate the device under test in a two-dimensional manner.

14. The multi-antenna test system according to claim 13, wherein the positioning device comprises at least two axes perpendicularly arranged with respect to each other.

15. A multi-antenna test method comprising:
    arranging at least four antenna devices spaced apart in a fixed angular relationship with respect to a device under test to create different certain angular relations between each of a plurality of pairs of the at least four antenna devices; and
    activating a maximum of two antenna devices of the at least four antenna devices at the same time such that the device under test and the two active antenna devices form a plane.

16. The multi-antenna test method according to claim 15, wherein at least one of the certain angular relations between each pair of the at least four antenna devices is one of an angle of 15 degrees, 30 degrees, 45 degrees, 60 degrees, 75 degrees, 90 degrees, 105 degrees, 120 degrees, 135 degrees, 150 degrees, 165 degrees and 180 degrees.

17. The multi-antenna test method according to claim 15, wherein the at least four antenna devices are arranged in a circular manner around the device under test.

18. The multi-antenna test method according to claim 15, further comprising:
    activating only one pair of the at least four antenna devices for testing, wherein the active pair defines an angle to be tested based on the respective certain angular relation.

* * * * *